Feb. 2, 1960 C. HOLOVKA, JR 2,923,452

PERFORATING MECHANISM FOR RECORD CARDS

Filed Oct. 1, 1956 2 Sheets-Sheet 1

INVENTOR.
CHARLES HOLOVKA, JR.
BY Donald F Voss
ATTORNEY.

PERFORATING MECHANISM FOR RECORD CARDS

Filed Oct. 1, 1956

United States Patent Office 2,923,452

Patented Feb. 2, 1960

2,923,452

PERFORATING MECHANISM FOR RECORD CARDS

Charles Holovka, Jr., Binghamton, N.Y., assignor to International Business Machines Corporation, New York, N.Y., a corporation of New York Application October 1, 1956, Serial No. 612,998

4 Claims. (Cl. 225—93)

This invention relates to a device for facilitating the recording of information in a record card having interrupted slits defining the areas of recordation.

In machines controlled by use of a record card normally electrically nonconductive, it is common practice to enter perforations into the card in a specific pattern to control the operation of the machine which senses these perforations electrically. Since the perforations are electrically sensed, it is necessary not to have any perforations existing in the card in positions other than those specifically intended for control of the machine. Accordingly, a record card, as disclosed in Patent 2,537,778 to McCormick, would not be suitable to control the operation of machines as described above.

The perforations to be made in a record card must be entered in a sharp manner and be of critical dimensions and free from ragged edges. It has been the practice to enter the perforations with the facilities of precision punching machines. These machines being very suitable to record accurate perforations in record cards are for the most part not portable so that perforations may be entered in the field at the source of the data. Moreover, if such perforating machines were made portable to make it feasible to enter data at the source, they would be inferior to the present invention for reasons of cost, maintenance and complexity of operation.

The present invention is particularly suited to enter perforations into record cards having interrupted slits defining the index positions.

Accordingly, it is a principal object of this invention to provide an improved means for accurately entering perforations into a record card having interrupted slits defining the index positions.

Another object of this invention is to provide an improved means for accurately entering perforations into a record card having interrupted slits defining the index positions in the field at the source of the data to be entered.

Still another object of this invention is to provide a simple means for accurately entering perforations into a record card having interrupted slits defining the index portions.

A further object of this invention is to provide an inexpensive means for accurately entering perforations into a record card having interrupted slits defining the index positions.

A still further object of this invention is to provide a means for accurately entering perforations into record cards having interrupted slits defining the index positions which are of a configuration other than that of the means for entering the perforations.

Other objects of the invention will be pointed out in the following description and claims and illustrated in the accompanying drawings, which disclose, by way of examples, the principle of the invention and the best mode, which has been contemplated, of applying that principle.

It is well known that record cards for controlling the operations of tabulating, statistical and other like machines contain a plurality of index positions. Furthermore, it is well known that by entering perforations into the record card, the above-mentioned machine having means to electrically sense these perforations will function in a predetermined manner upon sensing the perforations.

Still further it is well known that the perforations must be accurate and well formed so as not to cause malfunctioning or misfunctioning of a machine.

To epitomize the invention, it may be stated that the invention comprises apparatus for entering perforations in a record card having index positions defined by interrupted slits by exerting force in a uniform manner upon the area within the interrupted slits so as to rupture the connecting ties holding the said bounded area integral with said record card, thereby producing an accurate, well-defined perforation.

Figures 1, 2:
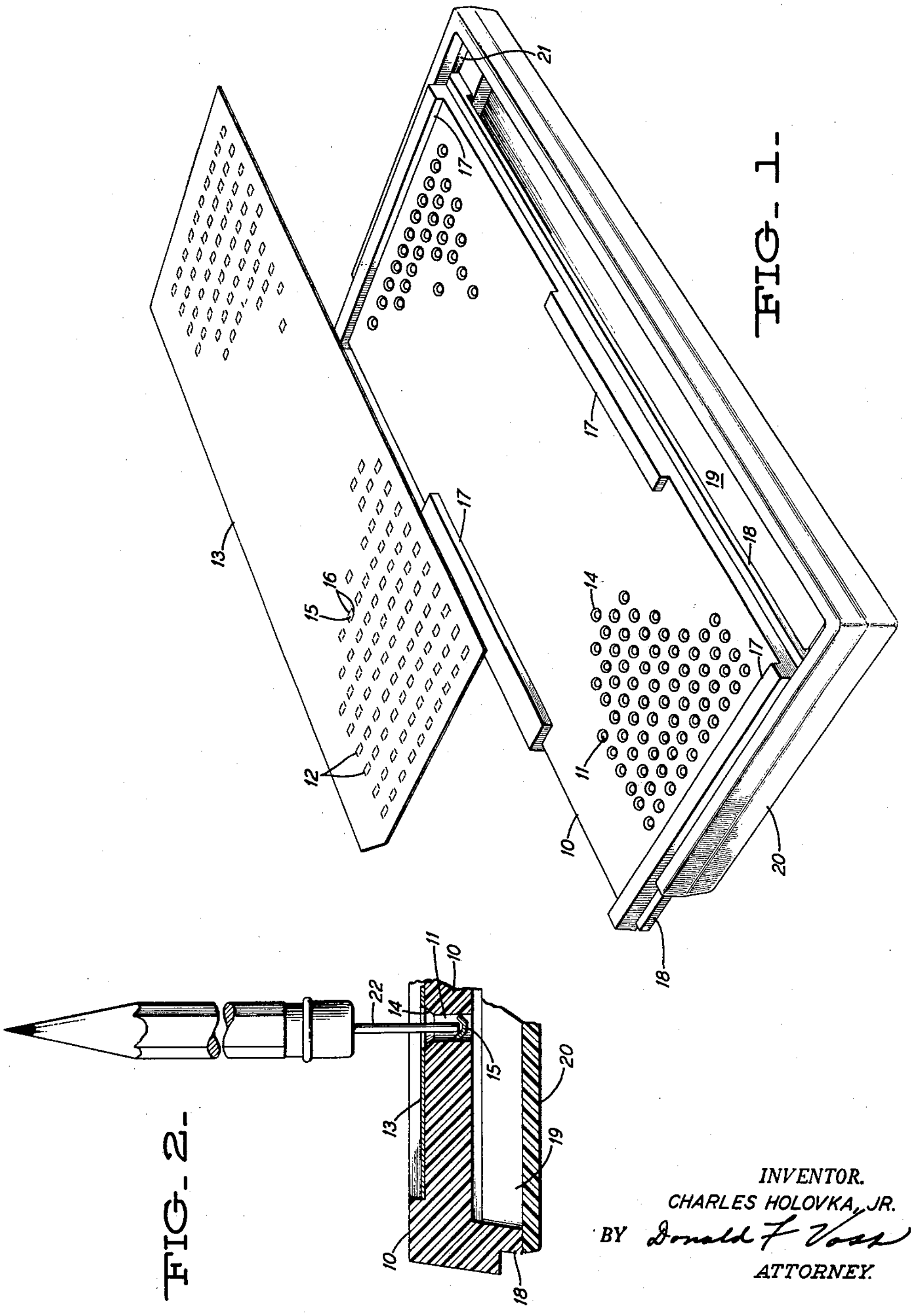
Fig. 1 is a perspective view of an embodiment of the invention.
Fig. 2 is a fragmentary sectional view of an embodiment of the invention.
Figures 3, 4, 5:
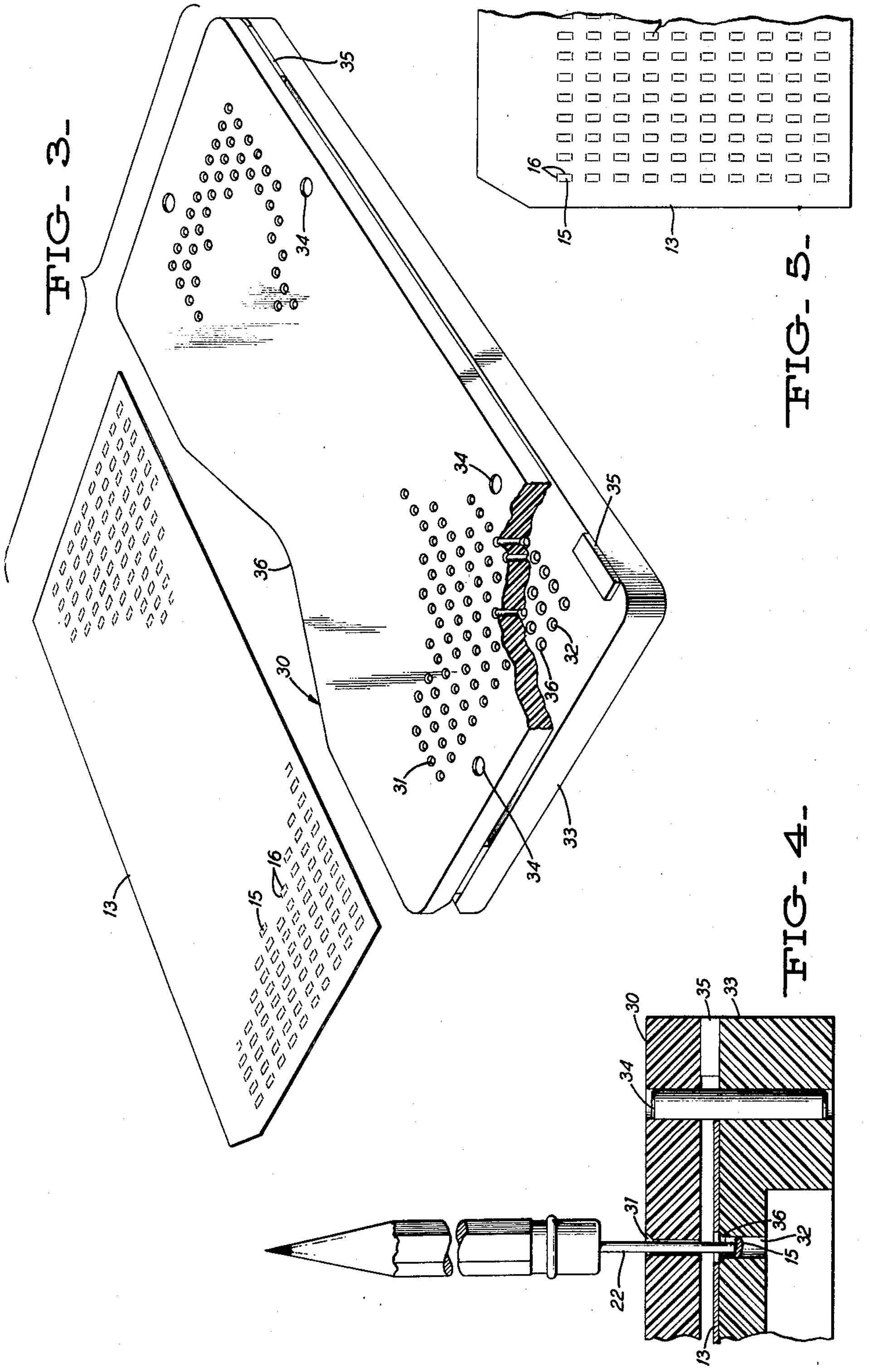
Fig. 3 is a perspective view of a preferred embodiment of the invention.
Fig. 4 is a fragmentary sectional view of the preferred embodiment of the invention.
Fig. 5 is a partial view of the record card having interrupted slits defining the index portions of the card.

Referring to the drawings, Fig. 1, a base plate 10 has a plurality of circular holes 11 corresponding to the index positions 12 in a record card 13. The holes are countersunk so as to provide a gripping surface 14 for gripping that area 15 of the record card 13 within the interrupted slits 16. The countersunk portion 14 of the holes 11 must be of a critical dimension so that the area 15 within the slits 16 will be gripped uniformly; otherwise the ties holding the said area integral with the card will not evenly break away from the record card, thereby leaving the said area still intact with the record card which could cause malfunctioning of a machine to be controlled by said record card. It has been determined that the countersunk portion should be of a diameter equal to the largest dimension of the area within the slits whereas the holes 11 are slightly larger in diameter than the smallest dimension of the area within the slits. However, where the dimensions of the area to be removed are equal, the countersunk portion would have a diameter of this equal dimension and the diameter of hole 11 would be somewhat smaller than this equal dimension. Guide strips 17 rigidly attached to the plate 10 or integral therewith serve to receive and position the record card 13 so that the index positions 12 correspond with the holes 11. Flange portions 18 attached to the plate 10 and extending outwardly on three sides and downwardly on a fourth side are disposed to form a chip enclosure 19 in combination with a three-sided tray 20 having slots 21 therein to receive the outwardly extending sides 18. The downward extending flange 18 serves to enclose the chip tray. To record any desired data, an operator, Fig. 2, places the record card into position on the plate 10 and by use of a punch 22 having a diameter slightly less than that of the hole 11 at the tip of the punch pushes the area 15 within the slits downward into the countersunk portion of the hole and on through the hole into the chip tray. For convenience the punch 22 may be inserted into an eraser on the end of an ordinary lead pencil, as shown in Fig. 2. The countersunk portion 14 of the hole grips the area 15 in a uniform manner, and as pressure is continued to be exerted on this area by the pin 22, the ties holding the said portion integral with the record card are ruptured. A preferred embodiment of this invention is shown in Fig. 3. A plate 30 having holes 31 with a center line corresponding to the center line of holes 32 in a base plate 33 supported by a series of pins 34 extending upwardly from the plate 33 lies parallel to said plate 33 and spaced therefrom by means of spacers 35 to permit a record card to be placed therebetween. The plate 30 serves as a guide for the operator so that the punch 22 will engage the central portion of the area within the interrupted slits and thereby will present said portion of the record card uniformly to the countersunk portion.

The holes 31 which are smaller in diameter than the holes 32 are substantially of the same diameter as the pin 22. Relieving the guide holes 31 by countersinking them facilitates insertion of the punch 22. The holes 32 having the same dimensions as the abovementioned holes 11 are also countersunk to provide a gripping surface 36 for gripping the area 15 of the record card. The pins 34 which serve to hold the plate 30 in alignment with the base plate 33 also serve as guides for positioning and maintaining a record card in position so that the index positions of the record card correspond with the holes in the plate 33. The curved portion 36 of the plates 30 and 33 allows for easy insertion and removal of the record card. A chip tray similar to the one in the previously described embodiment would also be included in the preferred embodiment. It is proposed that the guide plate 30 be of clear plastic so as to make it unnecessary to have a legend on the guide holes. In this manner the operator has a full view of the record card as in the first described embodiment.

In Fig. 5 there is shown a detailed view of the interrupted slits defining the index positions. The ties formed by the interruptions are of sufficient strength to hold the portion within the slits integral with the record card during a sensing operation in a record card controlled machine. Cards which have been subjected to severe tests have stood up without the ties being ruptured. However, when the invention is employed for entering perforations into the card, the ties are easily ruptured in a clean-cut manner.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. An apparatus for entering perforations into a record card having a plurality of index portions contained within interrupted slits, with the interruptions formed by the slits serving as ties to maintain the index portions integral with said record card, comprising in combination a record card receiving means having a plurality of holes corresponding to at least one of said index portions, each of said holes surrounded by a countersunk portion having a diameter equal to the largest dimension of the area of one of said index portions, the diameter of each of the holes being slightly larger than the smallest dimension of the area of one of said index portions; and a punch element having a diameter smaller than the diameter of said holes and operable for removing one of the index portions by engaging and forcing the same into the countersunk hole to uniformly grip and rupture the index portion from said record card as the index portion is forced into said hole.

2. An apparatus for entering perforations into a record card having a plurality of index portions contained within interrupted slits, with the interruptions formed by the slits serving as ties to maintain the index portions integral with said record card, comprising in combination a plate having a plurality of holes corresponding to said index portions, each of said holes surrounded by a countersunk portion having a diameter equal to the largest dimension of the area of one of said index portions, the diameter of each of the holes being slightly larger than the smallest dimension of the area of one of said index portions; means for receiving and holding record cards in position so that the holes in said plate correspond with the index portions in the record card; and a punch element having a diameter smaller than the diameter of said holes and operable for removing one of the index portions by engaging and forcing the same into the countersunk hole to uniformly grip and rupture the index portion from said record card as the index portion is forced into said hole.

3. An apparatus for entering perforations into a record card having a plurality of index portions contained within interrupted slits, with the interruptions formed by the slits serving as ties to maintain the index portions integral with said record card, comprising in combination a plate having a plurality of holes corresponding to said index portions, each of said holes surrounded by a countersunk portion having a diameter equal to the largest dimension of the area of one of said index portions, the diameter of each of the holes being slightly larger than the smallest dimension of the area of one of said index portions; guide bars fixedly attached to said plate in a manner to receive and hold the record cards in position so that the holes in said plate correspond with the index portions in the record cards; and a punch element having a diameter smaller than the diameter of said holes and operable for removing one of the index portions by engaging and forcing the same into the countersunk hole to uniformly grip and rupture the index portion from said record card as the index portion is forced into said hole.

4. An apparatus for entering perforations into a record card having a plurality of index portions having an area of equal dimensions contained within interrupted slits, with the interruptions formed by the slits serving as ties to maintain the index portions integral with said record card, comprising in combination a record card receiving means having a plurality of holes corresponding to said index portions, each of said holes surrounding a countersunk portion having a diameter equal to the equal dimension of the area of one of said index portions, the diameter of each of the holes being slightly less than the equal dimension of the area of one of said index portions; and a punch element having a diameter smaller than the diameter of said holes and operable for removing one of said index portions by engaging and forcing the same into the countersunk hole to uniformly grip and rupture said portion from the index portion as the index portion is forced into said hole.

References Cited in the file of this patent

UNITED STATES PATENTS

| | | |
|---|---|---|
| 194,347 | Grafelmann | Aug. 21, 1877 |
| 836,658 | Widner | Nov. 20, 1906 |
| 1,553,378 | Harper | Sept. 15, 1925 |
| 1,692,764 | Salt | Nov. 20, 1928 |
| 1,871,597 | English | Aug. 16, 1932 |
| 1,959,101 | Hasselquist | May 15, 1934 |
| 2,137,716 | Faas | Nov. 22, 1938 |
| 2,335,552 | Unger | Nov. 30, 1943 |
| 2,537,778 | McCormick | Jan. 9, 1951 |
| 2,557,797 | Rand | June 19, 1951 |
| 2,745,492 | Brook | May 15, 1956 |